United States Patent [19]
Lipscomb et al.

[11] Patent Number: 5,473,687
[45] Date of Patent: Dec. 5, 1995

[54] METHOD FOR RETRIEVING SECURE INFORMATION FROM A DATABASE

[75] Inventors: Thomas H. Lipscomb; Robert H. Nagel, both of New York, N.Y.

[73] Assignee: Infosafe Systems, Inc., New York, N.Y.

[21] Appl. No.: 174,741

[22] Filed: Dec. 29, 1993

[51] Int. Cl.⁶ ..................................................... H04L 9/00
[52] U.S. Cl. ................................................................ 380/4
[58] Field of Search ............................................ 380/4, 46

[56] References Cited

U.S. PATENT DOCUMENTS 4,994,008  7/1990  Piosenka et al. .......................... 380/46
5,195,136  3/1993  Hardy et al. .............................. 380/46

*Primary Examiner*—Salvatore Cangialosi
*Attorney, Agent, or Firm*—Karl F. Milde, Jr.

[57] ABSTRACT

A system for retrieving a packet of informational digital data which is stored on a secure storage medium. The informational data packet (IDP) is read from the secure storage medium and then expanded in length to form a sequence of digital data which is so large as to be inconvenient for permanent storage.

18 Claims, 6 Drawing Sheets

METHOD FOR RETRIEVING SECURE INFORMATION FROM A DATABASE

BACKGROUND OF THE INVENTION

The present invention relates to a system (method) for retrieving secure information from a database for temporary storage and usage by an information user.

Systems for storage and retrieval of secure information are well known in the art. As used herein, the term "secure information" is intended to mean information (alphanumeric data, graphics and the like) which is either encrypted or otherwise protected to prevent access thereto except by an authorized user. Such systems have been proposed and are employed both for the case where the information source (database) is centralized, and for the case where the information source has been distributed to multiple users. In the latter case, CD-ROMs have been used to export databases to multiple users so that information storage and retrieval takes place at the user site.

In the U.S. Pat. No. 5,010,571 to Ron Katznelson and the U.S. Patents Nos. 4,827,508, 4,977,594 and 5,050,213 to Victor Shear, it is proposed to provide encrypted digital information on CD-ROMs at the user site and to monitor and account for each item or "packet" of information which is retrieved and decrypted from a CD-ROM by an authorized user.

This concept of retrieving information on a "pay-as-you-go" basis is also disclosed in the U.S. Pat. No. 5,247,575 of Peter J. Sprague and Thomas H. Lipscomb to include encrypted data which is "broadcast" to multiple user sites from a central source and to permit individual access to encrypted data at a central source, as required, using conventional time sharing techniques and transmission via telephone dial-up or local area network (LAN) or wide area network (WAN) communication.

All of these prior art systems permit the user's access to the secure information to be monitored and strictly controlled. However, once the information has been decrypted and made available to the user, the user has access to it indefinitely and can reproduce it any number of times.

The problem of copying cleartext information is a familiar one to information providers. For example, the publisher of a trade journal or magazine well knows that a single issue or subscription will be circulated among a large number of readers and each reader may and in fact, does, photocopy one or more articles for further distribution to multiple readers. As a result, the information provider must set an artificially high subscription fee since the number of paid subscriptions to the trade journal represents only a small fraction of the total number of readers of articles in this journal.

Clearly, legal restrictions based on the copyright law are not effective to curb and protect against unauthorized copying of the published information.

With secure information provided electronically to an information user, it is possible to insert a "virus" in the data stream which causes the information to automatically self-destruct, or at least be made unreadable, after a given date or a given length of time. This technical solution to the problem of copying cleartext information is not wholly satisfactory because, at best, it places artificial temporal limits on the user and, at worst, the "virus" itself can be attacked and destroyed by appropriate technical means.

SUMMARY OF THE INVENTION

An object of the present invention is to provide a system (method and apparatus) for discouraging and preventing unauthorized storage and retrieval (copying) of cleartext information which has been electronically retrieved by an authorized user from a secure information source.

A further object of the present invention is to provide a system for electronic retrieval of a plurality of "information packets" from a secure information source in such a way as to discourage unauthorized use of these packets.

It is a further object of the present invention to provide a system for discouraging electronic storage of cleartext information packets for continued and continuous availability to an information user.

It is a further object of the present invention to provide a system for preventing repeated use and copying of cleartext information which is available in electronic storage.

These objects, as well as further objects which will become apparent from the discussion that follows, are achieved, in accordance with the present invention, by "decompressing" the information packet—that is, increasing the size of the information packet—so that the long term storage of this information packet would be awkward, inconvenient and expensive. For this reason, the information user is inclined to delete the information packet from electronic storage and then retrieve it again from the secure information source, paying the relatively nominal charge imposed by the information provider.

When "decompressing", "expanding" or "exploding" the information, it is important that the information not be capable of being compressed again, for example, by means of the "zip" program which looks for redundancy in the data. Accordingly, the information packet is preferably expanded by means of the following method:

(a) producing a series of first pseudorandom digital data having a bit length which is at least twice the bit length of the information packet; and (b) combining the information packet with the first pseudorandom data to form second pseudorandom digital data having a bit length which is at least twice the bit length of the information packet.

The information packet and the first pseudorandom data are combined in such a way that the information data can be extracted from the second pseudorandom data.

The information packet is thus expanded into a packet of pseudorandom data which is sufficiently large to discourage permanent storage of this expanded data. In a preferred embodiment of the present invention, this final bit length is equal to at least 1.5 megabytes, which is greater than the amount of data which can fit on a conventional 1.44 megabyte data diskette. All information packets, of whatever size, are preferably expanded ("exploded") to this final prescribed length.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
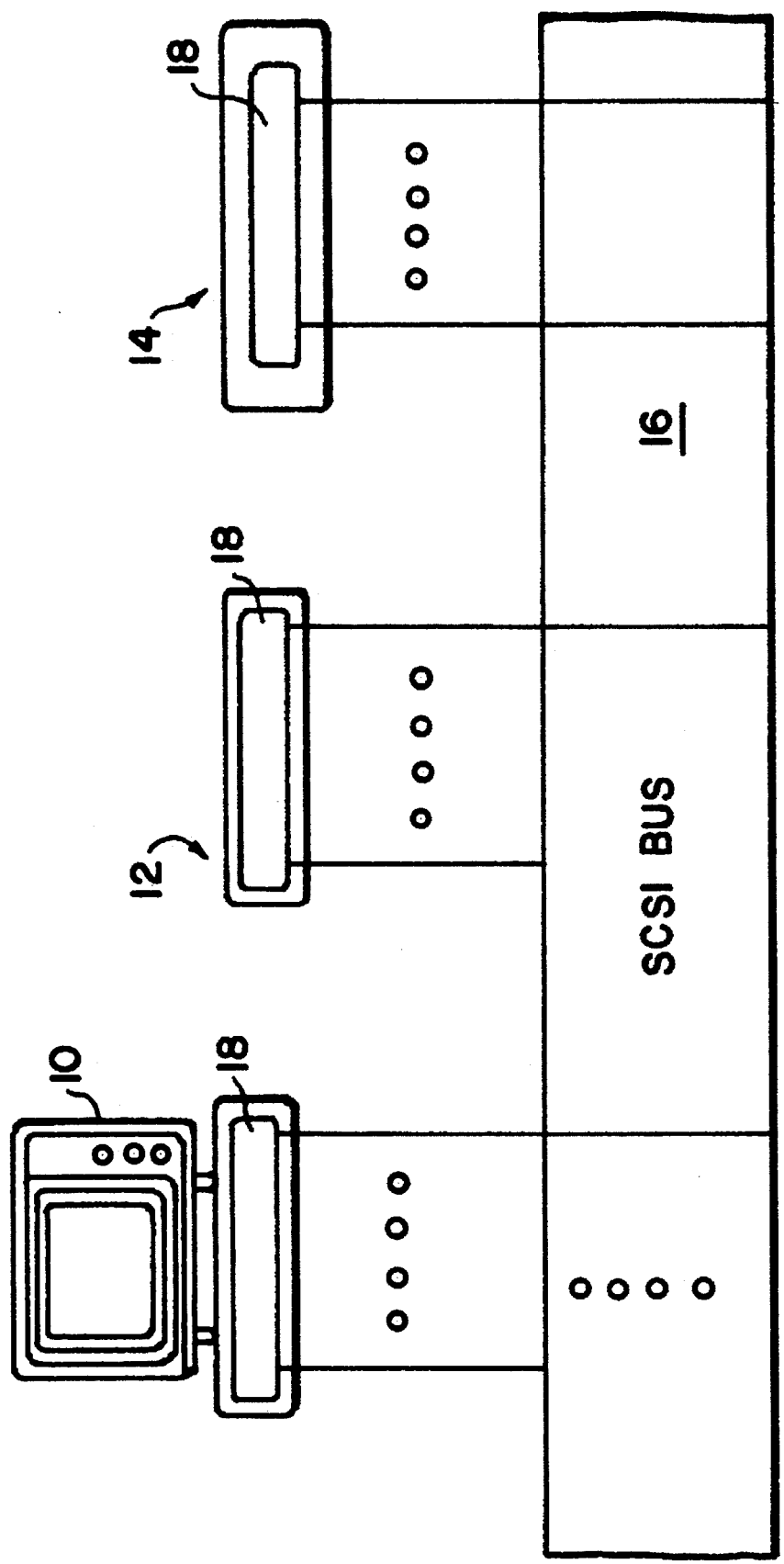
FIG. 1 is a representative diagram of a workstation comprising a personal computer (PC), a CD-ROM reader and a decryption controller.

The preferred embodiments of the present invention will now be described with reference to FIGS. 1—6 of the drawings. Identical elements in the various figures are designated with the same reference numerals.

FIG. 1 illustrates the general nature of the system according to the present invention. As shown here, the system involves a digital computer workstation which is capable of retrieving secure data from a database stored on a relatively high volume storage medium. If the database is physically situated at the local site, the storage medium may, for example, be a CD-ROM, a hard disk, a streamer tape or the like.

In order to prevent unauthorized access to the stored information, the individual information packets are preferably encrypted prior to storage on the high volume storage medium. Alternatively, the storage medium itself and the storage medium reader may be secure and accessible only to authorized users. By way of example, and not limitation, the information may be stored on a hard disk in a hard disk drive which is accessible only upon entry of a validated authorization code.

In the preferred embodiment, the information packets are stored in encrypted form on a CD-ROM and can be retrieved by any workstation user by means of a CD-ROM reader. However, only an authorized user with a proper validated code is allowed to decrypt the encrypted information.

Upon release of the secure information to an authorized user, the user is charged a preset fee set by the information provider (copyright owner or publisher of the information). This charge is effected automatically by debiting a financial account which has previously been established between the user and the information provider.

To implement this system, there is provided a workstation comprising a personal computer (PC) 10, a CD-ROM reader 12 and a decryption controller 14. These three devices, which may be stand-alone devices each arranged in a separate enclosure or combined in one or two enclosures —e.g., the PC 10 in one enclosure and the CD-ROM reader 12 and controller 16 in another—are connected in a well-known manner to a Small Computer System Interface ("SCSI") bus 16 via a bus interface and controller 18.

The personal computer 10 and the CD-ROM reader 12 are conventional devices which are available commercially. The decryption controller is a special purpose device which operates to receive encrypted data from the CD-ROM reader, decrypt this data if authorized to do so, and transport the decrypted data to the host computer 10 for storage either in its active memory (RAM) or hard disk drive.

The decryption controller also keeps a running account of the identity of, and charge for each information packet which is decrypted for later transmission, e.g. by telephone line, to a central billing facility at a remote site. A monitoring facility of this type is known from the aforementioned U.S. Pat. Nos. 5,010,571; 4,827,5089 and 5,247,575.

Once an informational data packet is decrypted and transferred to the host computer 10, the workstation user can display it on the computer screen, print out a hard copy and/or transmit a copy by LAN or modem to another workstation.

In accordance with the SCSI standard, the SCSI bus extends no more than twenty-six feet in length from end to end and is provided with terminating impedances at each end. Each unit arranged on the bus is provided with a unique address from a maximum of eight addresses (zero to seven). The computer is always given the address number seven; the addresses of the other devices on the bus may be selected from zero to six with a manual switch arranged on each device.

In the preferred embodiment of the present invention, the decryption controller 14 is disposed in its own enclosure, separate and apart from the personal computer 10 and possibly also the CD-ROM reader 12. To safeguard the firmware and codes which are used by the electronic circuitry, the decryption controller may be provided with light sensitive, erasable memory circuits so that the contents of memory are erased if and when the enclosure is opened.

Figure 2:
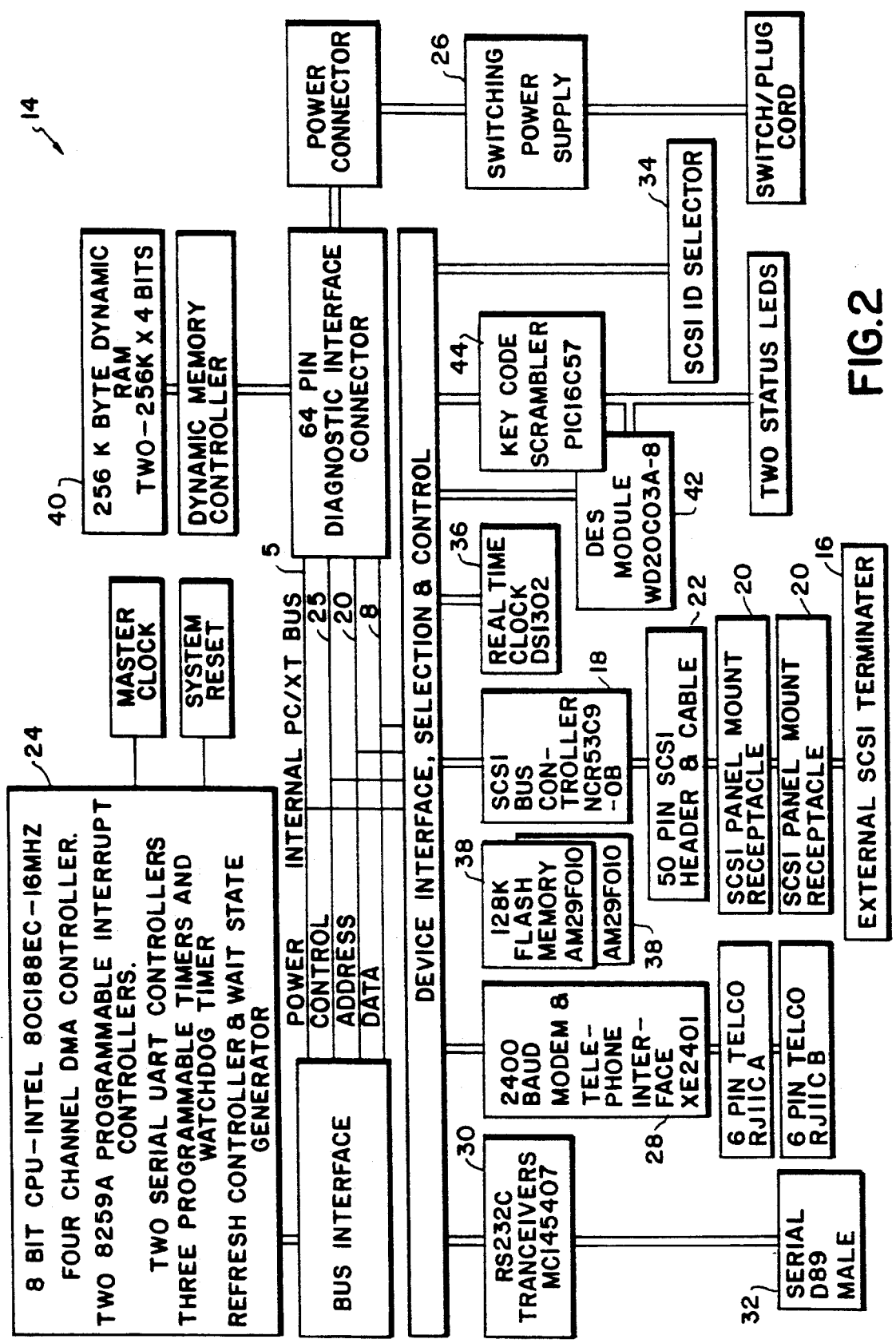
FIG. 2 is a block diagram of a decryption controller for use in the system of FIG. 1.

FIG. 2 shows a preferred embodiment of the decryption controller. This device is connected to the SCSI bus 16 via receptacles 20 and a fifty pin header 22. The SCSI bus controller 18 operates in conjunction with a CPU 24 to receive requests for data from the host computer 10 and initiate requests for this data from the CD-ROM reader 12.

The device is provided with its own separate power supply 26 so that it operates completely independently of the host computer 10.

The decryption controller is also provided with a 2400 baud modem and telephone interface 28 so that it may communicate with a central billing computer at a remote site. This central billing computer routinely calls the decryption controller 18 at regular intervals—for example, each night—to download the logged information concerning each informational data packet (IDP) that was decrypted, and/or to credit the financial account maintained by the decryption controller when the workstation user makes payment.

The decryption controller 18 can also communicate with other devices, such as printers or the like, by means of an RS-232C transceiver 30 and an associated serial port connector 32.

The SCSI address is set from zero to six by a manual ID selector 34. Date and time are provided by a real time clock 36.

Firmware for the decryption controller is provided on two 128K flash memory chips 38; intermediate scratch pad storage is provided by a 256K dynamic RAM 40.

Decryption of encrypted data is effected by a Data Encryption Standard (DES) module 42 which operates in conjunction with a key code scrambler 44. The key code scrambler maintains the keys used by the DES module for decryption and for generation of pseudorandom numbers. All keys utilized by the system are maintained in the decryption controller so that neither the workstation user nor the PC 10 will have access to these keys.

All of the electronic circuit devices contained in the decryption controller of FIG. 2 are standard, commercially available devices. Part numbers are shown in FIG. 2 for the major components.

Figure 3:
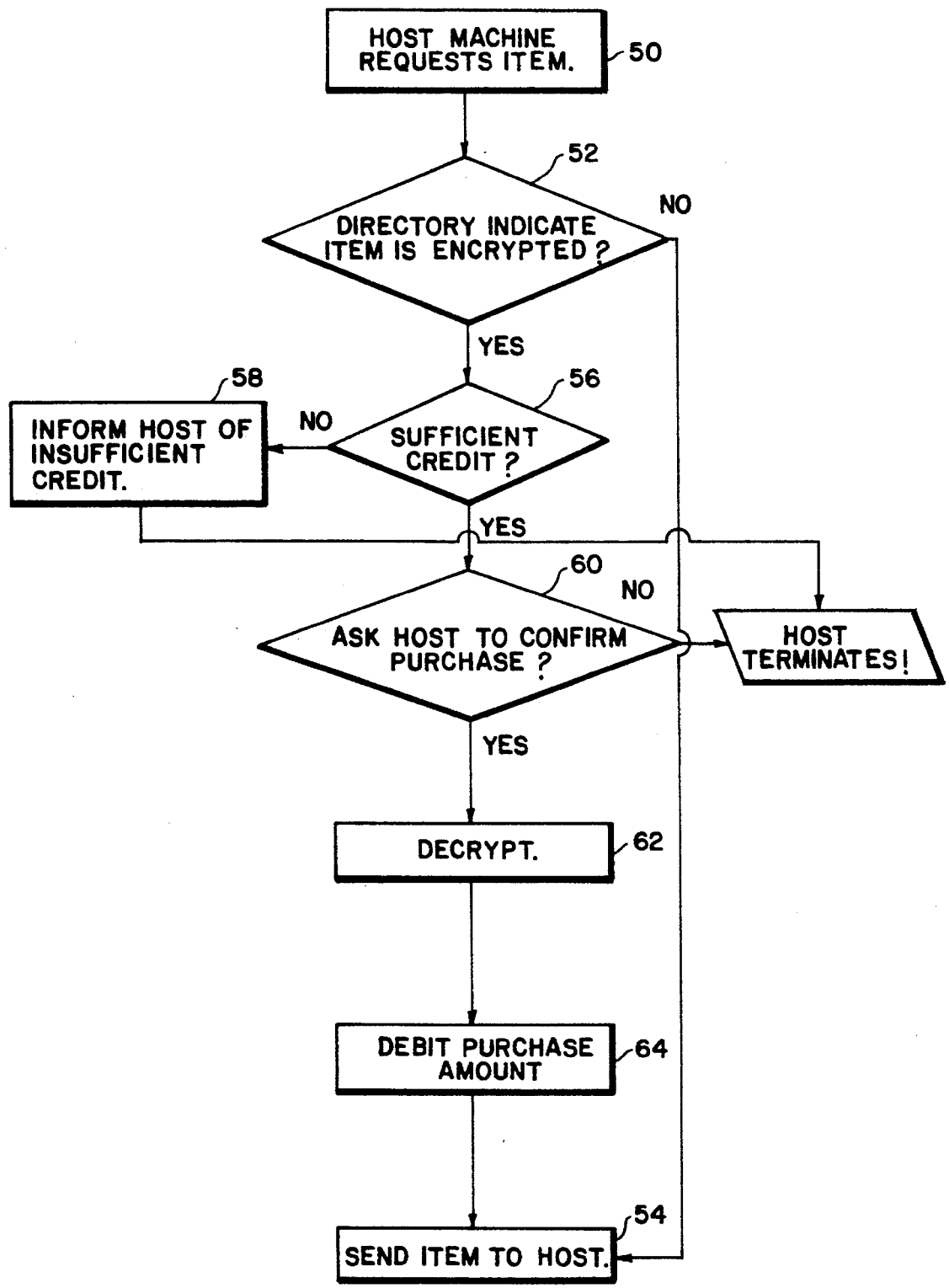
FIG. 3 is a flow chart showing the general operation of the system of FIG. 1 without the present invention.
Figure 4:
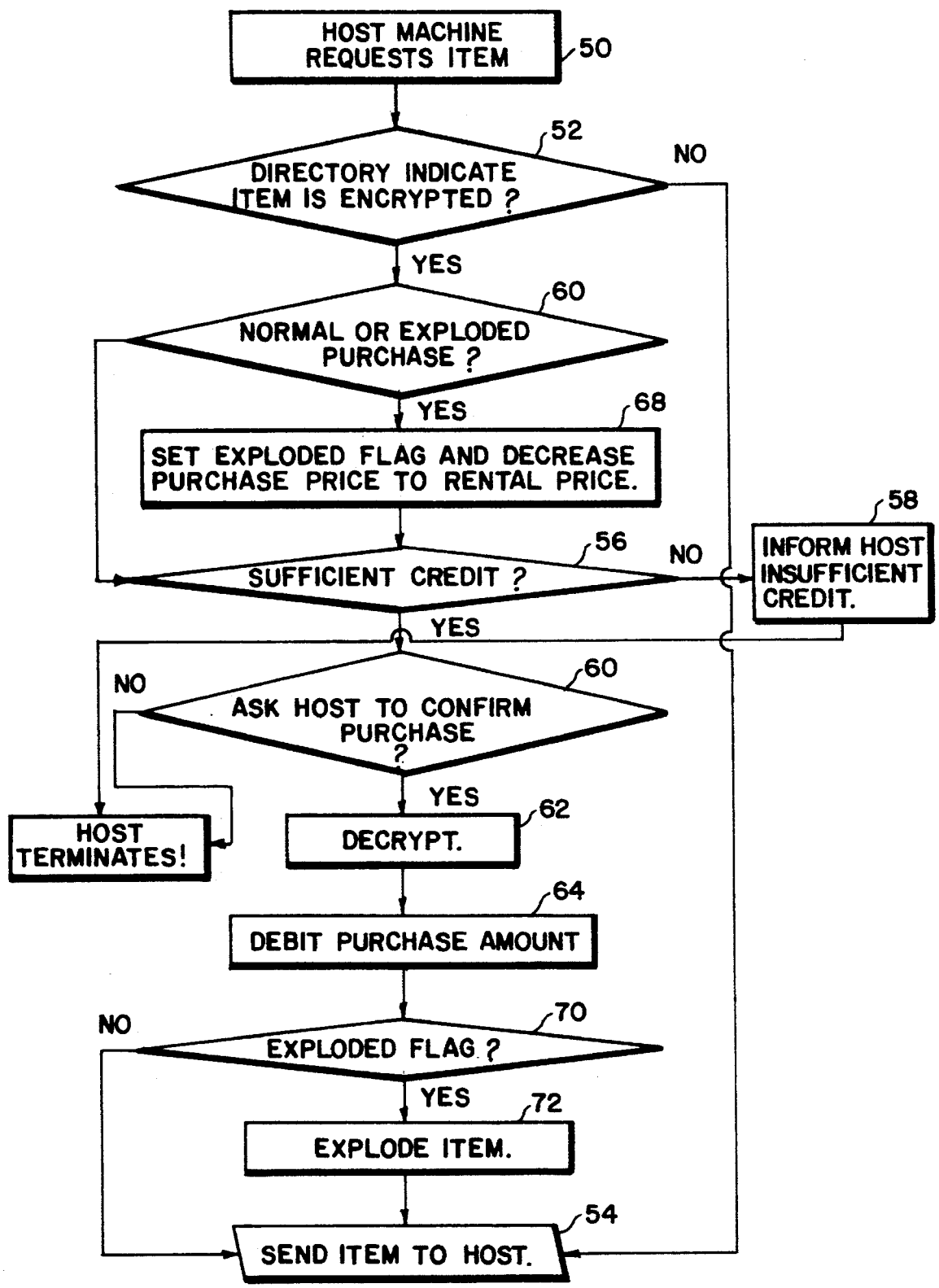
FIG. 4 is a flow chart showing the operation of the system of FIG. 1, as modified in accordance with the present invention.
Figure 5:
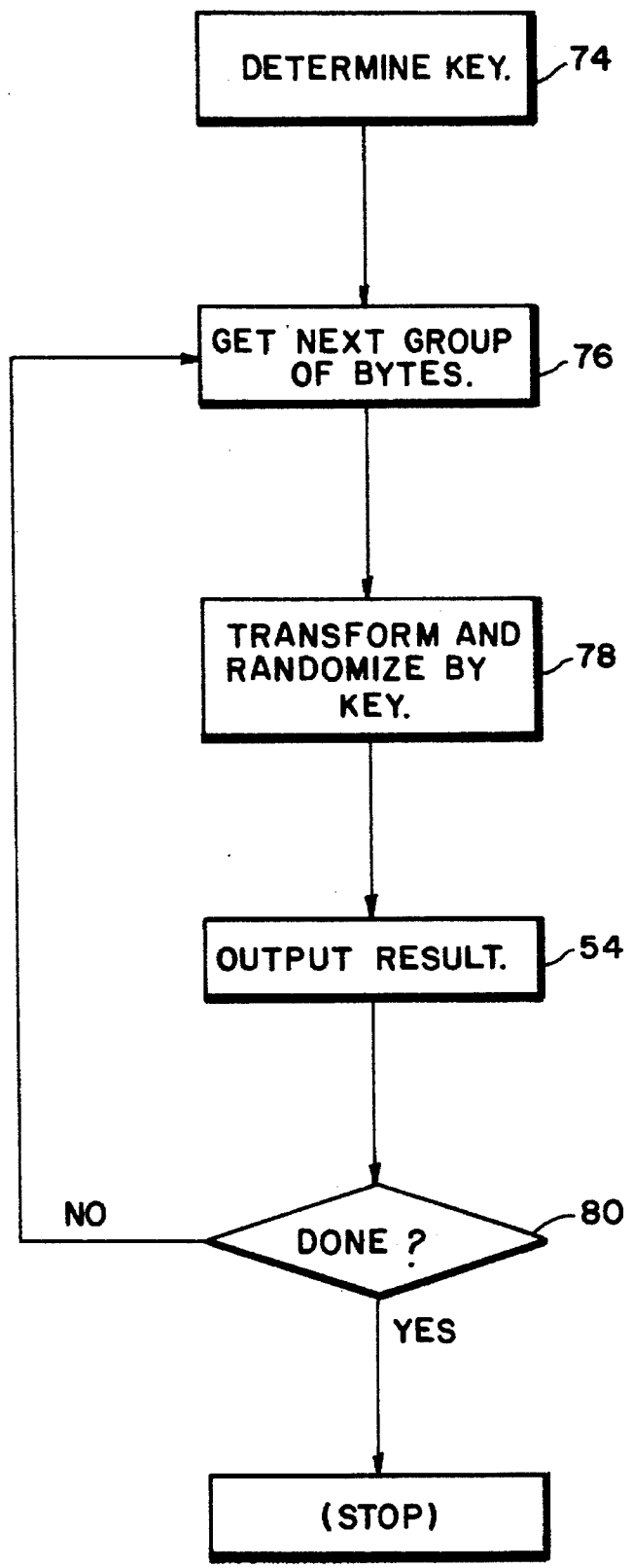
FIG. 5 is a flow chart showing the detailed operation of the system in the functional block "explode item" of FIG. 4.
Figure 6:
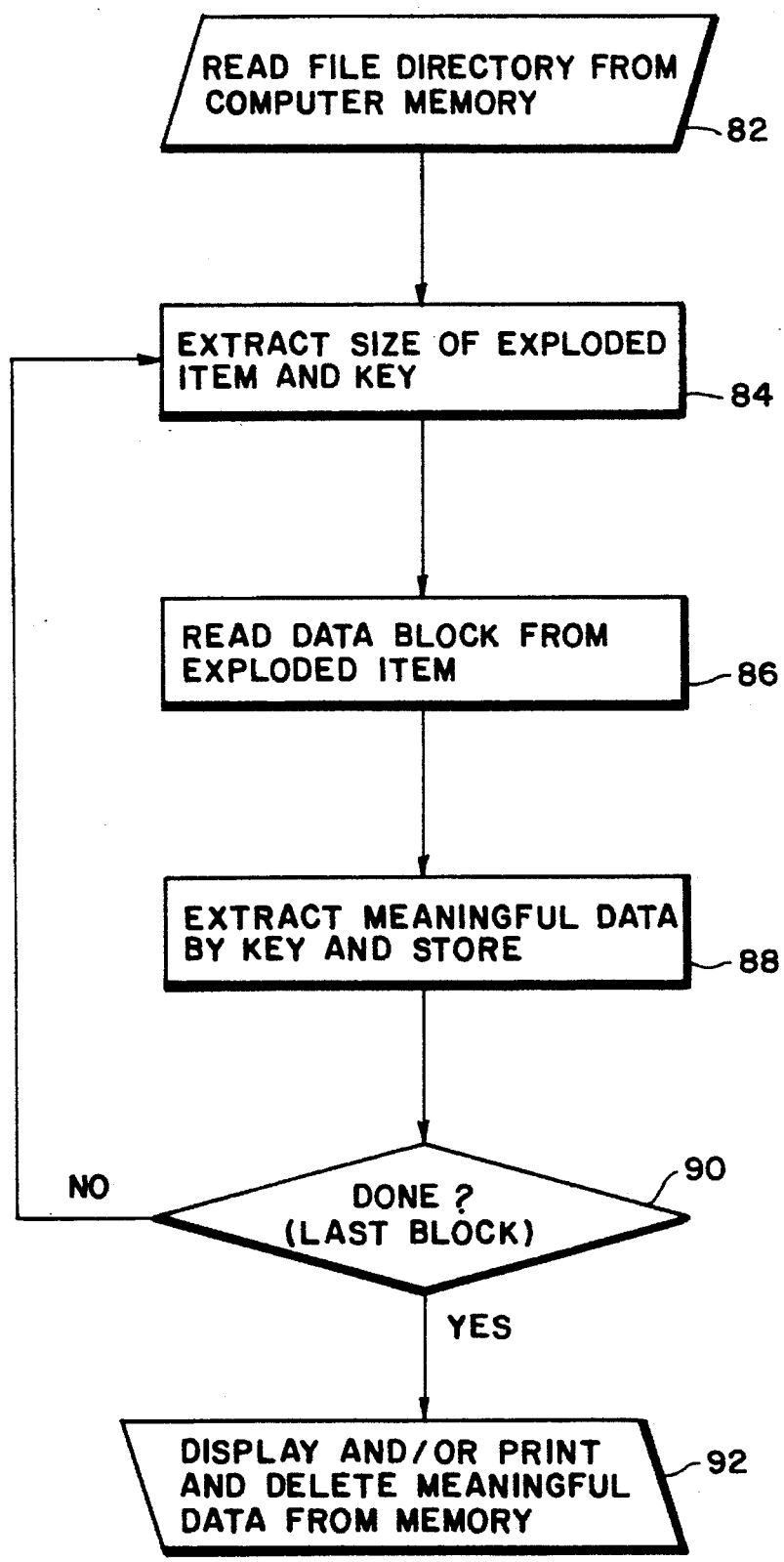
FIG. 6 is a flow chart showing how an exploded information packet is retrieved from temporary storage by the personal computer.

The system of FIG. 1 and, in particular, the decryption controller of FIG. 2, operates in the manner shown by the flow charts of FIGS. 3–6. FIG. 3 provides an overview of the operation while FIGS. 4 and 5 illustrate the operation in ever increasing detail. FIG. 6 shows how informational data packets (IDP's) are extracted from expanded data.

Referring to FIG. 3, the retrieval of a packet of an informational data (an "item") commences with a request by the host computer 10 (Block 50). The host computer sends this request to the decryption controller 14 via the SCSI bus which processes the request and sends the item to the host, as if it were the CD-ROM reader. The host computer 10 thus addresses the decryption controller, rather than the CD-ROM reader; however, with the exception of this difference, the host computer operates in such a manner as if it were requesting the item of data directly from the CD-ROM reader. Thus, as far as the host computer 10 is concerned, the decryption controller is the CD-ROM reader.

The decryption controller initially queries the file directory of the CD-ROM to determine whether the item of data is encrypted (Block 52). If not, the decryption controller initiates a data request from the CD-ROM reader 12, in the same manner as if it were the host computer, and reads the data item into its own RAM memory. Thereafter, the data item is transferred to the host computer (Block 54).

If the file directory indicates that the desired data item is encrypted, the decryption controller checks the user's financial account to determine if there is a sufficient positive balance to pay for the item (Block 56). If not, the decryption controller informs the host computer of the insufficient credit (Block 58).

If credit is sufficient, the decryption controller transmits the cost of the data item to the host computer and asks the host to confirm the purchase (Block 60).

If the host computer confirms the purchase of the data item at the price indicated, the item is read by the CD-ROM reader and transferred to the RAM of the decryption controller. Thereafter, the item is decrypted using the DES module and the decryption keys (Block 62). The purchase price of the item is then debited from the user's financial account (Block 64) and the item is transferred to the host computer (Block 54). Once the data item has been supplied to the host computer in decrypted form, it is available for storage, both temporary and archival storage, and may be read and copied any number of times. It is thus possible for the workstation user to "file it away" for repeated display and hard copy printing at a later time. With this in mind, the information provider is likely to set an appropriately high "purchase price" on the data item, knowing that the data item will probably be read only once from the CD-ROM and decrypted.

Alternatively, and in accordance with the present invention, the data item may be expanded or "exploded" to an inconveniently large size so that the workstation user will be discouraged from maintaining this item in permanent (archival) storage. What an inconveniently large size may be, in terms of numbers of bits or bytes, is probably different for different workstation users; however, preferably the data item is expanded to a bit length which is greater than the length of the largest hand-held removable storage medium (diskette). Since a typical diskette holds slightly less than 1.5 megabytes of information—i.e., 1.44 megabytes—the data item is preferably expanded to a bit length which is substantially equal to or greater than 1.5 megabytes.

If, according to the invention, the data item is so expanded, the workstation user will be inclined to delete the item from memory after the initial use (e.g., printout) and then retrieve it again from the encrypted storage— that is, the CD-ROM—when it is next needed in the future.

Consequently, the information provider (e.g., publisher) may be inclined, at its option, to set a reduced fee or charge for the one time use of the item of data. This reduced charge may be likened to a "rental fee", as opposed to the "purchase price" of the data item.

Referring to FIG. 4, it can be seen at a glance how the present invention may be applied to the operation of the system as illustrated in FIG. 3. FIG. 4 is identical to FIG. 3 with the exception that four new steps or blocks (Blocks 66, 68, 70 and 72) have been added. In Block 66, the decryption controller determines whether the data item requested should be provided in normal (one-to-one) form, or in exploded form. This decision may be made either by the information provider, and conveyed to the decryption controller by placing a "decision bit" in the file directory of the CD-ROM, or by the workstation user. In the latter case, the decryption controller receives the decision information as part of the initial request for data.

If it is determined that the data item is to be exploded (Block 66) then the decryption controller sets an "exploded flag" and decreases the purchase price of the item to a rental fee set by the information provider (Block 68).

Thereafter, after the data item has been decrypted and the financial account has been debited with the rental fee, the decryption controller determines the status of the exploded flag (Block 70) and, if set, the data item is exploded (Block 72) before transmitting it to the host computer.

In practice, the data item is exploded not as a unit but by successively processing conveniently sized blocks of this data. After decryption, when the data item is stored in the RAM 40 of the decryption controller, the CPU carries out the procedure shown in FIG. 5, block by block, and outputs the exploded data to the host computer.

As shown in FIG. 5, a key is determined (Block 74) for creating a pseudorandom number using a random number generating algorithm. The key may be preset in the decryption controller or determined in some other way; for example, by means of a telephone transmission from the central billing computer or by reference to the file directory of the CD-ROM.

Thereafter, a block or group of bytes of the data item are retrieved from RAM (Block 76) and exploded and randomized using the key (Block 78). The result is output and passed to the host computer (Block 54) and the process is repeated until all blocks of the data item have been exploded (Block 80) into pseudorandom data.

FIG. 6 shows how the host computer 10 operates to read the exploded item of pseudorandom data and transform it back into the original meaningful data. The computer starts by reading the file directory from the computer memory (Block 82) to extract the size of the exploded item of data and, if necessary, the key (Block 84).

Thereafter, the computer reads the exploded data item from memory, block by block (Block 86), extracting the meaningful data from each block with the aid of the key (Block 88) and storing this data in RAM. After the last block has been retransformed into meaningful data (Block 90) the meaningful data is displayed or printed and then deleted from storage (Block 92).

According to a preferred feature of the present invention, an item of data is expanded by embedding it into a series of pseudorandom digital data of suitable, expanded length so that the resulting sequence of digital data (exploded data item) cannot be compressed using a data compressing algorithm. This immunity from data compression relies on the fact that it is impossible to predict the value of any given bit in the final sequence of digital data, given the other bits in the sequence.

To present an unauthorized user from extracting the meaningful data from the pseudorandom digital data, this pseudorandom data is changed each time a data item is exploded. Clearly, if the pseudorandom data were a fixed bit sequence, this sequence could be determined from repeated usage.

To produce a different series of pseudorandom digital data for each expansion of meaningful data, the pseudorandom digital data is generated anew each time using a random number generator and a new key. The key is preferably obtained from information relating to the data-item to be expanded contained in the CD-ROM file directory. Such information may, for example, be the identity, location and length of the data item on the CD-ROM.

Finally, to further prevent an unauthorized user from extracting the meaningful data from the pseudorandom data, the data item is preferably embedded in the series of pseudorandom data a different way each time the data item is expanded. Thus, while the series of pseudorandom digital data may be the same each time the same item of data is expanded, the final sequence of digital data—i.e. the exploded item of data—will be different each time.

In a preferred embodiment of the present invention, the DES algorithm is used to generate the sequence of pseudorandom digital data using a key obtained from the CD-ROM file directory. Alternatively, the pseudorandom number generating algorithm may be formed by a linear feedback shift register (LFSR).

EXAMPLE

Set forth below is a specific example in which an informational data packet (IDP or "data item") is exploded into a longer sequence of digital data.

It is assumed at the outset that the data item is three bits long. Thus:

010

It is assumed also that a series of pseudorandom digital data is generated, for example using a key and a pseudorandom number generating algorithm, which is twenty-four bits long, thus:

011010011010110010011010

Step 1 (Optional): The meaningful data is expanded by converting each "0" to a first prescribed bit sequence (e.g. "10") and each "1" to a second prescribed bit sequence (e.g. "11").

The data item thus becomes:

101110

Step 2 (Optional): A sequence of bits is added at the end of the meaningful data as a "stop code", thus:

101110001

Step 3 (Optional): "0's" are arbitrarily inserted into the meaningful sequence between code pairs (not after the last digit), thus:

0001000111000000001

Step 4: The bit sequence is expanded to twenty-four bits (the length of the pseudorandom number) using the following algorithm:

Starting at a random point in the bit sequence, a series of bits within the sequence is added to the end to increase the length of the sequence, thus:

000100011100000000100111

Step 5: The meaningful data (MD) bit sequence produced in step 4 is combined with the pseudorandom digital data (PS) using the "exclusive-or" function to produce a final result (FR), thus:

PS=011010011010110010011010

MD=000100011100000000100111

FR=011110000110110010111101

The final result is incompressible because it contains random information.

To extract the meaningful data from the final result, the following steps are performed (which essentially reverses the sequence of operations above).

Step A: The key is obtained and the pseudorandom digital data PS is recreated using the same random number generating algorithm.

Step B: The exploded data item (the final result FR determined in Step 5, above) is read from memory and this final result is combined with the pseudorandom number, bit by bit, using the "exclusive-or" function, to produce an intermediate sequence (IS), thus:

PS=011010011010110010011010

FR=011110000110110010111101

IS=000100011100000000100111

If the sequence of data is too long to process at once, this combining step may take place one block at a time where a "block" is any convenient size such as thirty-two bits— three bytes—in length.

Step C: The intermediate sequence (IS) is scanned bit by bit from beginning to end. When a one bit is encountered, the next bit in the sequence is selected, thus:

010011

If the last bit of the sequence IS is a "1", the next (nonexistent) bit is ignored.

The length of the data item file is determined from the beginning of the file or the file directory and this many digits is selected from the beginning of the result above. These first digits are the original data item. The remaining digits are ignored.

In this particular case, we return to the original data which is:

010.

The procedure above "expands" data to the precise length of the pseudorandom digital data sequence (in this case twenty-four bits). By selecting the length of the pseudorandom sequence, it is possible to expand the data item to any desired length. As explained above, it is advantageous to expand the data to about 1.5 megabytes.

The minimum length of the expanded data using the procedure outlined above is twice the original length of the data item. Preferably, the data item is expanded to at least three times its original length.

Since data is recorded on a CD-ROM in blocks of 2,048 bytes, this block size is preferably used in the block by block expansion. If the data item is to be expanded to three times its size, each block input to the expansion algorithm will produce three blocks of expanded data. If the expansion multiple is not a whole number—e.g. 3.3—it is possible to reach this objective by expanding some blocks of data with a ratio of 1:3 and other blocks with a ratio of 1:4.

Normally, the data expansion is carried out by software (firmware) in the decryption controller, whereas data item extraction from the expanded data is carried out by the software in the host computer. In this case, the pseudorandom digital data may be obtained from the decryption controller or generated independently by the host computer using the same random number generating algorithm and key. If the original key was derived using information from the header of the data file, the host computer software can access this header as well.

There has thus been shown and described a novel method for retrieving secure information from a database which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of retrieving a packet of informational digital data which is stored in encrypted form, said method comprising the steps of:

(a) retrieving the stored informational data packet (IDP);

(b) decrypting the IDP into a first sequence of digital data;

(c) expanding the first sequence of digital data into a second sequence of digital data which is so large as to be inconvenient for permanent storage, said expanding step including the step of embedding said first sequence of digital data in a series of pseudorandom digital data which is substantially equal to 1–5 megabytes or more in length, such that said second sequence is substantially equal to 1.5 megabytes or more in length and is not compressible;

(d) storing said second sequence of digital data;

(e) retrieving the stored second sequence of digital data; and (f) extracting the IDP from said second sequence.

2. The method defined in claim 1, wherein said first sequence of digital data is embedded in a different way during each successive execution of said expanding step.

3. The method defined in claim 1, wherein said embedding step includes the steps of obtaining a key and a random number generating algorithm which requires a key, and thereafter executing said random number generating algorithm with said key to produce said pseudorandom digital data.

4. The method defined in claim 3, wherein said key is obtained from an external source.

5. The method defined in claim 3, wherein a plurality of IDPs are stored in encrypted form on a storage medium having a file directory stored thereon indicating the identity, location and length of each IDP, and wherein said step of obtaining said key includes the steps of reading said file directory and determining said key from information contained therein.

6. The method defined in claim 5, wherein said key is determined from information contained in said file directory relating to the IDP to be decrypted.

7. The method defined in claim 3, wherein said information data packet (IDP) is stored on a storage medium and wherein said key is obtained from said storage medium.

8. The method defined in claim 3, wherein said information data packet (IDP) is stored on a storage medium with a file directory which contains the identity, location and length of said IDP, and wherein said key is obtained from said file directory.

9. The method defined in claim 3, wherein said random number generating algorithm is the Data Encryption Standard (DES) algorithm.

10. The method defined in claim 3, wherein said random number generating algorithm is formed by a linear feedback shift register.

11. The method defined in claim 1, wherein said information data packet (IDP) is stored on a storage medium in a plurality of blocks each of a prescribed length, and wherein said packet is combined, block by block, with said pseudorandom digital data to expand the bit length of each block such that the total length of all expanded blocks of data is substantially equal to 1.5 megabytes or more.

12. The method defined in claim 1, wherein said length of said second sequence is greater than the largest hand-held, removable storage medium.

13. The method defined in claim 1, wherein said embedding step is unique each time said packet is expanded.

14. The method defined in claim 1, wherein the bit length of said pseudorandom digital data is equal to the bit length of said second sequence.

15. The method defined in claim 1, wherein the bit length of said second sequence is equal to at least twice the bit length of said first sequence.

16. The method defined in claim 14, wherein the bit length of said second sequence is equal to at least said twice the bit length of said first sequence plus two binary digits.

17. The method defined in claim 1, wherein said step of extracting the IDP from said second sequence includes the steps of:

(e) producing said pseudorandom digital data; and (f) combining said pseudorandom digital data with said second sequence to produce said information data packet.

18. The method defined in claim 17, wherein said combining step (f) includes the steps of:

(1) logically combining said pseudorandom data with said second sequence by exclusive-or to produce a result; and (2) scanning said result for binary one's.

* * * * *